(12) United States Patent
Freitag et al.

(10) Patent No.: US 11,670,816 B2
(45) Date of Patent: Jun. 6, 2023

(54) GLASS-TO-METAL SEAL TERMINAL PIN FOR AN ELECTROCHEMICAL CELL

(71) Applicant: Greatbatch Ltd., Clarence, NY (US)

(72) Inventors: Gary Freitag, East Aurora, NY (US); Joseph M. Prinzbach, North Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 17/408,550

(22) Filed: Aug. 23, 2021

(65) Prior Publication Data

US 2022/0059890 A1 Feb. 24, 2022

Related U.S. Application Data

(60) Provisional application No. 63/068,644, filed on Aug. 21, 2020.

(51) Int. Cl.
*H01M 50/171* (2021.01)
*H01M 50/188* (2021.01)
*H01M 50/148* (2021.01)

(52) U.S. Cl.
CPC ....... *H01M 50/171* (2021.01); *H01M 50/154* (2021.01); *H01M 50/188* (2021.01)

(58) Field of Classification Search
CPC . H01M 50/171; H01M 50/188; H01M 50/154
See application file for complete search history.

(56) References Cited

U.S. PATENT DOCUMENTS

| | | |
|---|---|---|
| 4,310,609 A | 1/1982 | Liang et al. |
| 4,391,729 A | 7/1983 | Liang et al. |
| 4,792,503 A | 12/1988 | Eppley |
| 5,360,678 A | 11/1994 | Spillman et al. |
| 5,415,959 A | 5/1995 | Pyszczek et al. |
| 5,756,229 A | 5/1998 | Pyszczek et al. |
| 6,117,195 A | 9/2000 | Honegger |
| 6,136,466 A | 10/2000 | Takeuchi et al. |
| 6,425,928 B2 | 7/2002 | Hallifax et al. |
| 6,686,088 B2 | 2/2004 | Probst et al. |
| 6,929,881 B2 | 8/2005 | Wutz et al. |
| 7,718,310 B1 | 5/2010 | Frustaci et al. |
| 7,749,651 B2 | 7/2010 | Wutz et al. |
| 10,205,151 B2 | 2/2019 | Dai et al. |
| 2002/0155350 A1* | 10/2002 | Spillman ............. H01M 50/566 29/623.2 |
| 2003/0022062 A1 | 1/2003 | Wutz et al. |
| 2006/0175071 A1 | 8/2006 | Knappen et al. |
| 2019/0363313 A1* | 11/2019 | Chiang ............... H01M 50/562 |

OTHER PUBLICATIONS

"Extended European Search Report Application No. 21192643.1, dated Jan. 12, 2022".

* cited by examiner

*Primary Examiner* — Brian R Ohara
*Assistant Examiner* — Emily Elizabeth Freeman
(74) *Attorney, Agent, or Firm* — Michael F. Scalise (57) ABSTRACT

A lid assembly for an electrochemical cell comprises a plate-shaped lid having an opening and a glass-to-metal seal (GTMS) residing in the lid opening. The GTMS does not have a ferrule. Instead, the GTMS has a sealing glass that seals directly to a terminal pin and to the lid. The terminal pin has an enlarged diameter pin section contacted by the sealing glass and a first reduced diameter pin section extending axially outwardly from the enlarged diameter pin section. An electrochemical cell provided with the lid assembly is also described.

14 Claims, 6 Drawing Sheets

GLASS-TO-METAL SEAL TERMINAL PIN FOR AN ELECTROCHEMICAL CELL

CROSS-REFERENCE TO RELATED APPLICATION

This application claims priority to U.S. provisional application Ser. No. 63/068,644, filed on Aug. 21, 2020.

BACKGROUND OF THE INVENTION

1. Field of the Invention

The present invention relates to the conversion of chemical energy to electrical energy. More particularly, the present invention relates to a lid assembly for an electrochemical cell. The lid assembly comprises a glass-to-metal seal (GTMS) comprising a glass sealing directly to a terminal pin and to the lid. The terminal pin of the GTMS has an enlarged diameter pin section contacted by the sealing glass and at least a first reduced diameter pin section extending outwardly from the enlarged diameter pin section.

2. Prior Art

Hermetically sealed electrochemical cells typically utilize a glass-to-metal seal (GTMS) to electrically isolate either or both the positive terminal pin and the negative terminal pin. The GTMS must be designed appropriately to achieve a reliable compression of the glass, forming a robust seal that can withstand mechanical and thermal loads and not degrade over the life of the electrochemical cell. The diameter of the terminal pin must be specifically designed to the diameter of the glass seal and the casing enclosure. However, the diameter of the terminal pin dictated by the GTMS may be different than the desired or required diameter for either internal electrical connections or external electrical connections outside the electrochemical cell.

Thus, there is a need to optimize the diameter of the terminal pin of a GTMS for both the internal electrical connection inside the cell casing and the external electrical connection to a device that is intended to be powered by the electrochemical cell.

SUMMARY OF THE INVENTION

The present invention relates to optimization of internal and external electrical connections to the terminal pin of a GTMS. Externally, a reduced diameter pin section of the terminal pin helps reduce the volume of the electrical connection of the electrochemical cell to an external device that is intended to be powered by the electrochemical cell, thereby helping to reduce the size of the external device. The reduced diameter pin section of the terminal pin can also be sized to match an external connector, for example, a push type connector. Not only can the size of the push connector be reduced, but a greater number of push connectors can populate a circuit board, and the like, which results in an increased number of electrical channels on the circuit board. Inside the electrochemical cell, the reduced diameter pin section of the terminal pin reduces the internal volume needed for the electrical connection to a current collector, thereby helping to decrease the size of the electrochemical cell.

2

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
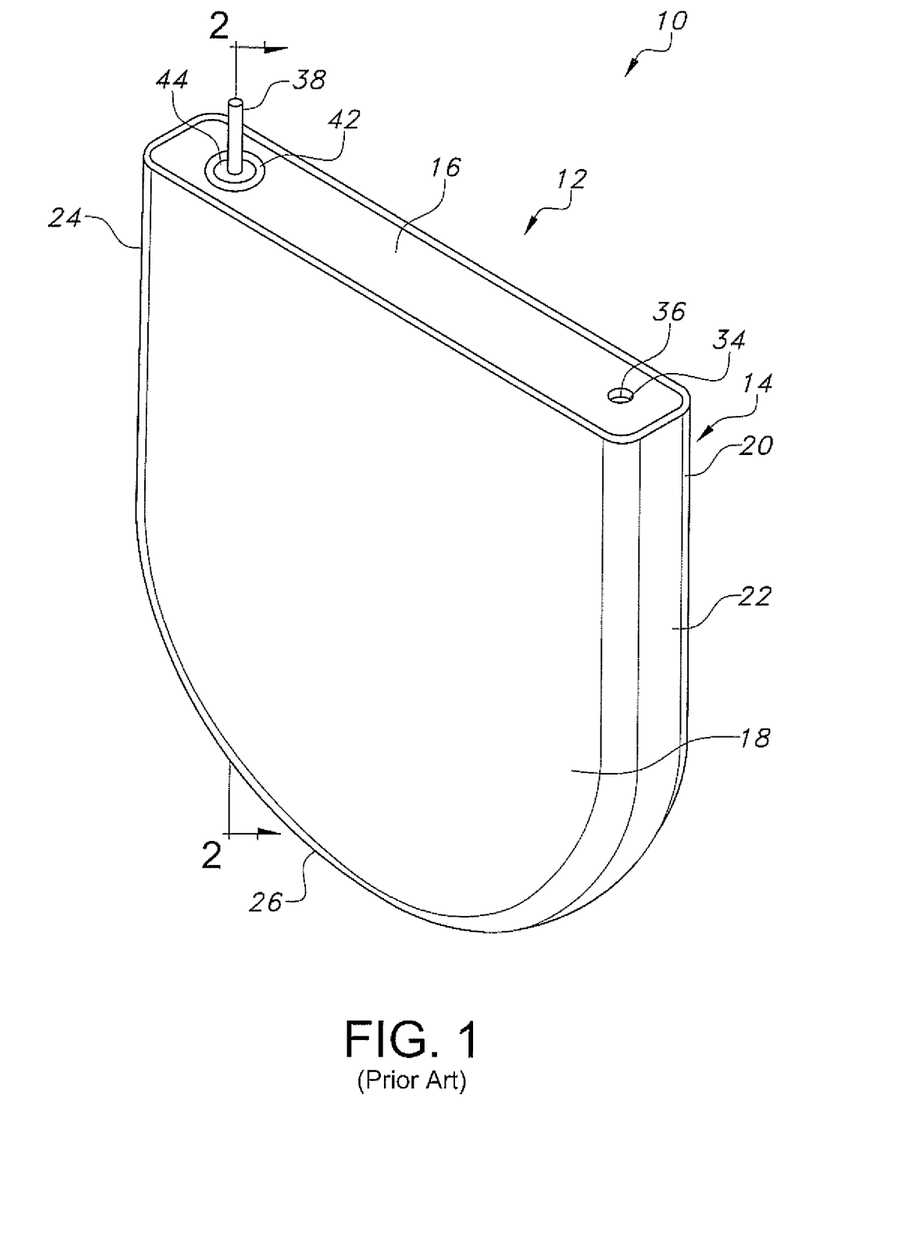
FIG. 1 is a perspective view of an exemplary electrochemical cell 10 according to the prior art.
Figure 2:
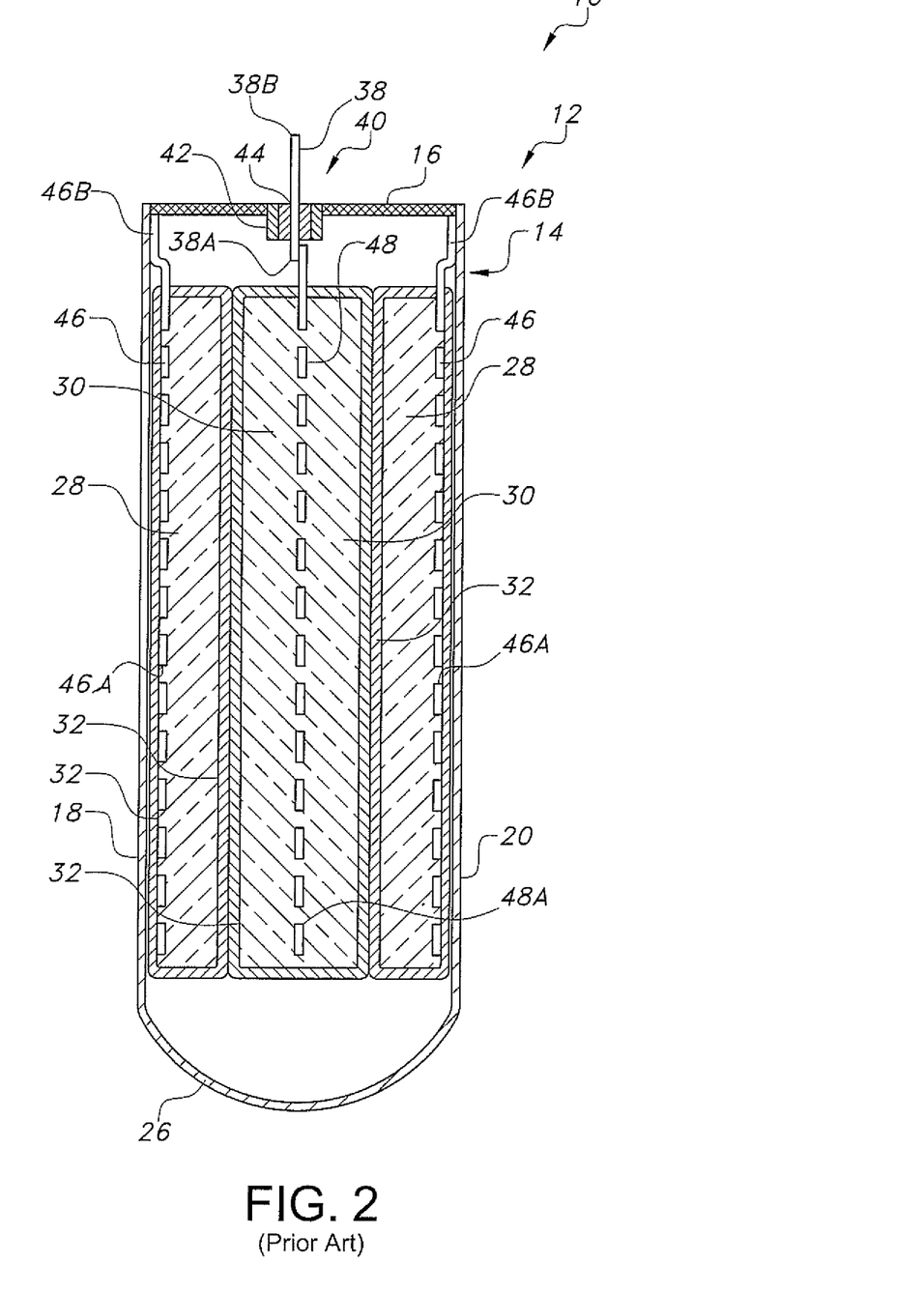
FIG. 2 is a cross-sectional view taken along line 2-2 of the exemplary electrochemical cell 10 shown in FIG. 1.

Turning now to the drawings, FIGS. 1 and 2 illustrate an exemplary electrochemical cell 10 according to the present invention. The electrochemical cell 10 comprises an enclosure or casing 12 formed from an open-ended container 14 closed by a plate-shaped lid 16 having a thickness that ranges from about 0.010 inches to about 0.048 inches. The container 14 has spaced-apart front and back sidewalls 18 and 20 joined by curved end walls 22 and 24 and a curved bottom wall 26. Alternatively, the open-ended container 14 may have a cross-sectional shape that is rectangular, elliptical or circular.

To construct the electrochemical cell 10, an electrode assembly comprising an anode 28 and a cathode 30 prevented from direct physical contact with each other by at least one intermediate separator 32 is positioned inside the container 14. After the electrode assembly is housed in the open-ended container 14, the container is closed by the lid 16. In one exemplary embodiment, the outer perimeter of the lid 16 is positioned within an interior perimeter formed by the front and back sidewalls 18, 20 joined to the curved end walls 22, 24 of the container 14. Alternatively, the lid 16 is positioned so that its bottom surface contacts the upper edges of the front and back sidewalls 18, 20 joined to the curved end walls 22, 24. Preferably, the lid 16 is joined to the container 14 by welding, for example, laser welding, resistance welding, arc welding, and magnetic pulse welding. It will be apparent to those skilled in the art that conventional welding parameters may be used in joining the lid 16 and the container 14 together. Soldering may also be used to join the lid 16 to the container 14.

After the open-ended container 14 is closed by the lid 16, an electrolyte (not shown) is filled into the casing 12 through a fill port or opening 34 provided in the lid 16. In its fully assembled condition shown in FIG. 1, a closure means 36 is sealed in the electrolyte fill port 34 to hermetically close the casing 12. A terminal pin 38 is electrically insulated from the casing 12 by a glass-to metal seal (GTMS) 40. The GTMS 40 resides in an opening in the lid 16.

Titanium is a suitable material for the container 14, the lid 16 and the ferrule 42 for the GTMS 40 of the casing 12. In addition to titanium, suitable materials for the container 14, the lid 16 and the ferrule 42 include stainless steel, mild steel, nickel-plated mild steel, but not limited thereto, so long as the metallic material is compatible for use with the other cell components.

Exemplary electrically insulating sealing glasses 44 residing between the terminal pin 38 and the ferrule 42 for the GTMS 40 include, but are not limited to, Ferro IP510, Corning 1890, Schott 8422 and Schott 8629.

Suitable materials for the terminal pin include molybdenum, tantalum, tungsten, and combinations thereof.

Referring back to FIG. 2, the exemplary electrochemical cell 10 is constructed in what is generally referred to as a case-negative design with the anode 28 electrically connected to the container 14 or lid 16 via an anode current collector 46 while the cathode 30 is electrically connected to the terminal pin 38 via a cathode current collector 48. Alternatively, a case positive cell design may be constructed by reversing these connections. In other words, in a case-positive design the terminal pin 38 is connected to the anode 28 via the anode current collector 46 and the cathode 30 is connected to the container 14 or lid 16 via the cathode current collector 48. In that respect, the specific geometry and chemistry of the electrochemical cell 10 can be of a wide variety that meets the requirements of a specific primary or secondary cell application.

Both the anode current collector 46 and the cathode current collector 48 are composed of an electrically conductive material. Suitable materials for the respective current collectors 46, 48 include stainless steel, titanium, tantalum, platinum, gold, aluminum, nickel, copper, Ti/NiV, cobalt nickel alloys, highly alloyed ferritic stainless-steel containing molybdenum and chromium, and nickel-, chromium- and molybdenum-containing alloys.

In greater detail, a primary electrochemical cell 10 that possesses sufficient energy density and discharge capacity for the rigorous power requirements of implantable medical devices comprises a lithium anode or its alloys, for example, Li—Si, Li—Al, Li—B and Li—Si—B. The form of the anode may vary, but preferably it is of a thin sheet or foil pressed or rolled on the metallic anode current collector 46.

The anode current collector 46 is of a scree-type construction having a plurality of perforations 46A bordered by an outer perimeter. The outer perimeter can be an unperforated frame or the perforations 46A can extend to the outer periphery of the current collector 46. The anode current collector 46 is further provided with an unperforated tab 46B that extends outwardly from the perimeter. The tab 46B is secured to an inner surface of the container 14 or the lid 16 so that the casing 12 serves as the negative terminal for the exemplary primary electrochemical cell 10. In the electrochemical cell 10 shown in FIG. 2 being of a primary chemistry, the anode comprises two anode plates, each comprising lithium, or a lithium-containing anode active material contacted to respective anode current collectors 46. The current collectors 46 are in turn electrically connected to the respective front and back sidewalls 18, 20 of the container 14, such as by a laser weld (not shown). If desired, the anode current collectors 46 can also be welded to the inner surface of the lid 16.

The cathode of a primary electrochemical cell 10 is of electrically conductive material, preferably a solid material. The solid cathode may comprise a metal element, a metal oxide, a mixed metal oxide, and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof. By way of example, in an illustrative primary electrochemical cell 10, the cathode active material comprising the cathode 30 is silver vanadium oxide as described in U.S. Pat. Nos. 4,310,609 and 4,391,729 to Liang et al. These patents are assigned to the assignee of the present invention and incorporated herein by reference.

Before being contacted to the current collector 48, however, the cathode active material is typically mixed with a binder material and a solvent. Binders such as, but not limited to, a powdered fluoro-polymer, more preferably powdered polytetrafluoroethylene or powdered poly vinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be used. The binder is preferably present at about 1 to about 5 weight percent of the cathode mixture.

Further, up to about 10 weight percent of a conductive additive is preferably added to the cathode active mixture to improve conductivity. Suitable materials for this purpose include acetylene black, carbon black and/or graphite or a metallic powder such as powdered nickel, powdered aluminum, powdered titanium and powdered stainless steel. The preferred cathode active mixture for a primary electrochemical cell 10 thus includes a powdered fluoro-polymer binder present at about 3 weight percent, a conductive additive present at about 3 weight percent, and about 94 weight percent of the cathode active material.

Similar to the anode current collector 46, the cathode current collector 48 is of a screen-type construction having a plurality of perforations 48A bordered by an outer perimeter. The outer perimeter can be an unperforated frame or the perforations 48A can extend to the outer periphery of the current collector 48. The cathode current collector 48 has an unperforated tab 48B that extends outwardly from the perimeter. The cathode tab 48B is secured to a proximal end of the terminal pin 38 of the GTMS 40. In that manner, the terminal pin 38, which is electrically isolated from the casing 12 comprising the container 14, lid 16 and ferrule 42, serves as the positive terminal for the electrochemical cell 10.

FIG. 2 shows that the cathode 30 is formed from two sheets or plates of the previously described cathode active mixture that have been rolled, spread, pressed or otherwise contacted to the opposite sides of the perforated portion of the cathode current collector 48. The cathode active mixture is shown also residing in the perforations 48A of the current collector 48. This serves to lock the opposed sheets or plates of the cathode active mixture to the current collector 48 and helps prevent sloughing and delamination of the cathode active material mixture from the current collector 48 during cell storage and discharge. Preferably, the cathode 30 comprising the two sheets of cathode active mixture contacted to the opposed sides of the perforated portion of the current collector 48 is enveloped in a separator bag 32. Alternately, the cathode 30 can be in the form of a strip that is wound with a corresponding strip of anode material in a structure similar to a "jellyroll" or a flat-folded electrode stack.

FIG. 2 further shows that in the exemplary electrochemical cell 10, the terminal pin 38 of the GTMS 40 has a constant diameter extending axially along its length from a terminal pin proximal end 38A to a terminal pin distal end 38B. The terminal pin proximal end 38A is connected to the tab 48B of the cathode current collector 48. The terminal pin distal end 38B resides outside the electrochemical cell 10, extending outwardly from the sealing glass 44 of the GTMS 40.

Figure 3:
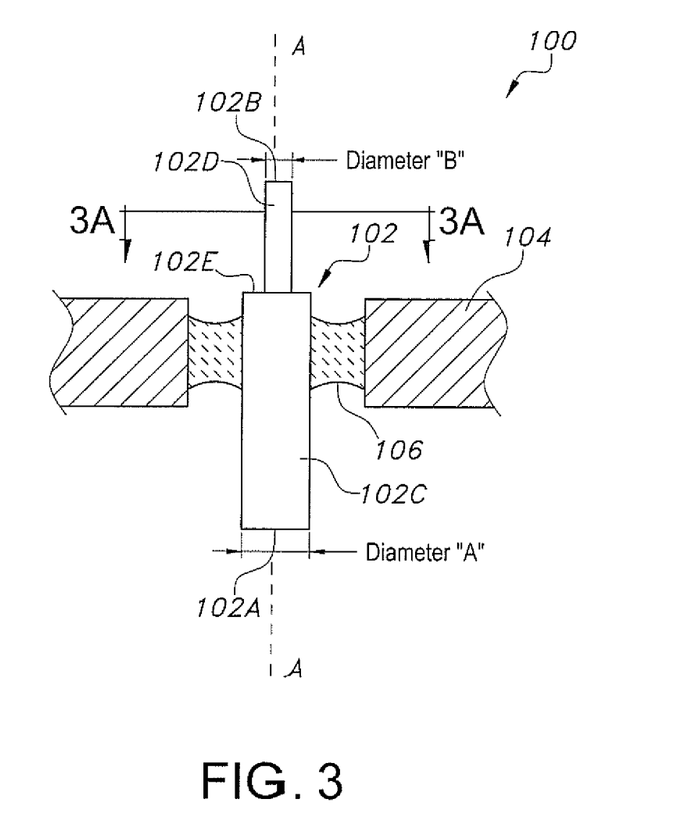
FIG. 3 is a cross-sectional view of a glass-to-metal seal (GTMS) 100 according to the present invention having a terminal pin 102 with an enlarge diameter pin section 102C and a reduced diameter pin section 102D.
Figure 3A:
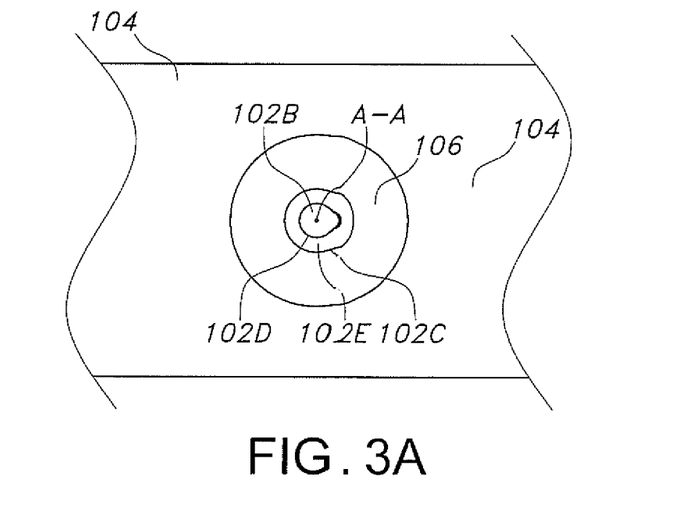
FIG. 3A is a plan view looking at the GTMS 100 along line 3A-3A of FIG. 3.

FIGS. 3 and 3A illustrate a lid assembly according to the present invention comprising a glass-to-metal seal (GTMS) 100. Unlike the conventional GTMS 40 shown in FIGS. 1 and 2 having the terminal pin 38 of a constant diameter along its length supported in an opening in a ferrule 42 by the sealing glass 44, the GTMS 100 of the present invention has a terminal pin 102 with two distinct diameter pin sections supported in an opening in a lid 104 by a sealing glass 106. In this embodiment, the GTMS 100 does not have a ferrule. The sealing glass 106 is similar to those describes above for the GTMS 40 shown in FIGS. 1 and 2 and serves to electrically isolate the terminal pin 102 from the lid 104. While not shown in the drawings, the lid 104 is welded to the open end of the container 14, as previously described.

The terminal pin 102 has a length extending along a longitudinal axis A-A from a terminal pin first end 102A to a terminal pin second end 102B. In one embodiment, the terminal pin first end 102A resides inside the casing 12 connected to the tab 48B of the cathode current collector 48, and the terminal pin second end 102B extends outside the cell casing. In an alternate embodiment, the terminal pin second end 102B resides inside the casing 12 connected to the tab 48B of the cathode current collector 48, and the terminal pin first end 102A extends outside the cell casing 12.

However, unlike the terminal pin 38 for the conventional GTMS 40 shown in FIGS. 1 and 2 having a constant diameter along its length, the terminal pin 102 shown in FIG. 3 has a first enlarged pin section 102C having an enlarged diameter "A" extending along the longitudinal axis A-A from the terminal pin first end 102A, through the sealing glass 106 to a second reduced diameter pin section 102D. The reduced diameter pin section 102D has a reduced diameter "B" extending to the second end 102B of the terminal pin 102.

More specifically, the enlarged diameter pin section 102C of the terminal pin 102 has a cross-sectional diameter that ranges from about 0.015 inches to about 0.045 inches. At a step 102E, the enlarged diameter pin section 102C transitions to the reduced diameter pin section 102D extending to the terminal pin second end 102B. The reduced diameter pin section 102D has a cross-sectional diameter that ranges from about 0.010 inches to about 0.020 inches.

Further, it is preferred that the step 102E from the enlarged diameter pin section 102C to the reduced diameter pin section 102D reside at a distance from the sealing glass 106 that is from about 0.5× to about 3× the diameter of the enlarged diameter pin section 102C. This provides a sufficient distance so that the glass 106 is hermetically sealed to the enlarged diameter pin section 102C without its meniscus reaching the step 102E. In an alternate embodiment, the sealing glass 106 contacts the enlarged diameter pin section 102C and extends to the step 102E but does not contact the reduced diameter pin section 102D. In any event, for a reliable hermetic seal it is preferred that the sealing glass contacts the enlarged diameter pin section 102C. The reduced diameter pin section 102D is desirable to help reduce the size or volume of the electrical connection of the electrochemical cell 10 to an external device, thereby reducing the size of the external device.

In that respect, with the lid 104 of the GTMS 100 shown in FIGS. 3 and 3A secured to the open end of the container 14 shown in FIGS. 1 and 2, the enlarged diameter pin section 102C (proximal) resides inside the casing 12 and the reduced diameter, pin section 102D (distal) extends axially outwardly from the casing. The enlarged diameter pin section 102C is connected to the tab 48B of the cathode current collector 48 so that the terminal pin 102 serves as the positive terminal for the electrochemical cell 10. If desired, however, the lid assembly according to the present invention comprising the GTMS 100 can be reversed with the reduced diameter pin section 102D (proximal) residing inside the casing 12 connected to the cathode current collector tab 48B and the enlarged diameter pin section 102C (distal) extending axially outwardly from the casing 12.

As shown in FIG. 2, in order to prevent internal short circuit conditions, the anode 28 is separated from the cathode 30 by the separator 32. Each of the opposed anode plates 28 is also housed inside a separator envelope 32. While housing the anode 28 and the cathode 30 in their own separator envelopes 32 is preferred for redundancy so that a short circuit condition is less likely to occur, at least one separator sheet residing between the opposite polarity anode 28 and cathode 30 is the minimum requirement for a functioning electrochemical cell 10.

Illustrative separator materials include non-woven glass, polypropylene, polyethylene, microporous materials, glass fiber materials, ceramics, the polytetrafluorethylene membrane commercially available under the designations ZITEX (Chemplast Inc.), the polypropylene membrane commercially available under the designation CELGARD (Celanese Plastic Company Inc.) and DEXIGLAS (C. H. Dexter, Div., Dexter Corp.). Other separator materials that are useful with the electrochemical cell 10 include woven fabrics comprising halogenated polymeric fibers, as described in U.S. Pat. No. 5,415,959 to Pyszczek et al., which is assigned to the assignee of the present invention and incorporated herein by reference. Examples of halogenated polymeric materials include, but are not limited to, polyethylene tetrafluoroethylene which is commercially available under the name Tefzel, a trademark of the Du Pont Company, polyethylenechlorotrifluoroethylene which is commercially available under the name Halar, a trademark of the Allied Chemical Company, and polyvinylidene fluoride.

When the electrochemical cell 10 is of a primary chemistry, the cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material. Suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof. Suitable salt concentrations typically range between about 0.8 to 1.5 molar.

Suitable low viscosity solvents include esters, linear and cyclic ethers and dialkyl carbonates such as tetrahydrofuran (THE), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for the electrochemical cell 10 of a lithium primary chemistry has 0.8M to 1.5M $LiAsF_6$ or $LiPF_6$ dissolved in a 50:50 mixture, by volume, of PC as the preferred high permittivity solvent and DME as the preferred low viscosity solvent.

When the electrochemical cell 10 is of a primary chemistry, the preferred anode active material 28 is lithium metal and the preferred electrolyte is 0.8M to 1.5M $LiAsF_6$ or $LiPF_6$ dissolved in a 30:70 mixture, by volume, of propylene carbonate as the preferred high permittivity solvent and 1,2-dimethoxyethane as the preferred low viscosity solvent.

In secondary electrochemical systems, the anode 28 comprises a material capable of intercalating and de-intercalating lithium. A carbonaceous anode material comprising any of the various forms of carbon (e.g., coke, graphite, acetylene black, carbon black, glassy carbon, etc.), which are capable of reversibly retaining lithium is preferred. Graphite is particularly preferred due to its relatively high lithium-retention capacity. Regardless the form of the carbon, fibers of the carbonaceous material are particularly advantageous because they have excellent mechanical properties that permit them to be fabricated into rigid electrodes capable of withstanding degradation during repeated charge/discharge cycling.

The cathode 30 of a secondary electrochemical cell 10 preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$ (lithium cobalt nickel oxide), $LiFePO_4$, $LiNi_xMn_yCo_{1-x-y}O_2$ (lithium nickel manganese cobalt oxide), $LiNi_xCoyAl_{1-x-y}O_2$ (lithium nickel cobalt aluminum oxide), $Li_4Ti_5O_{12}$, lithiated silver vanadium oxide, lithiated copper vanadium oxide, lithiated copper silver vanadium oxide ($Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$). Preferred sulfides include lithiated copper sulfide, lithiated iron sulfide, lithiated iron disulfide and lithiated titanium disulfide.

The lithiated active material is preferably mixed with a solvent, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP), and up to about 10 weight percent of a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof. The binder is present at about 1 weight percent to about 5 weight percent of the cathode mixture. Thus, the preferred cathode active mixture for a primary electrochemical cell 10 includes a powdered fluoro-polymer binder present at about 3 weight percent, a conductive diluent present at about 3 weight percent, and about 94 weight percent of the cathode material.

Before being contacted to the current collector 48, however, the cathode active material is mixed with a binder material and a solvent. Binders such as, but not limited to, a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be used. The binder is preferably present at about 1 to about 5 weight percent of the cathode mixture.

Suitable secondary electrochemical systems are comprised of non aqueous electrolytes of an inorganic salt dissolved in a non aqueous solvent and more preferably one of the above-described lithium salts dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such battery chemistries because they exhibit high oxidative stability toward cathode materials and good kinetic stability toward anode materials.

Figure 4:
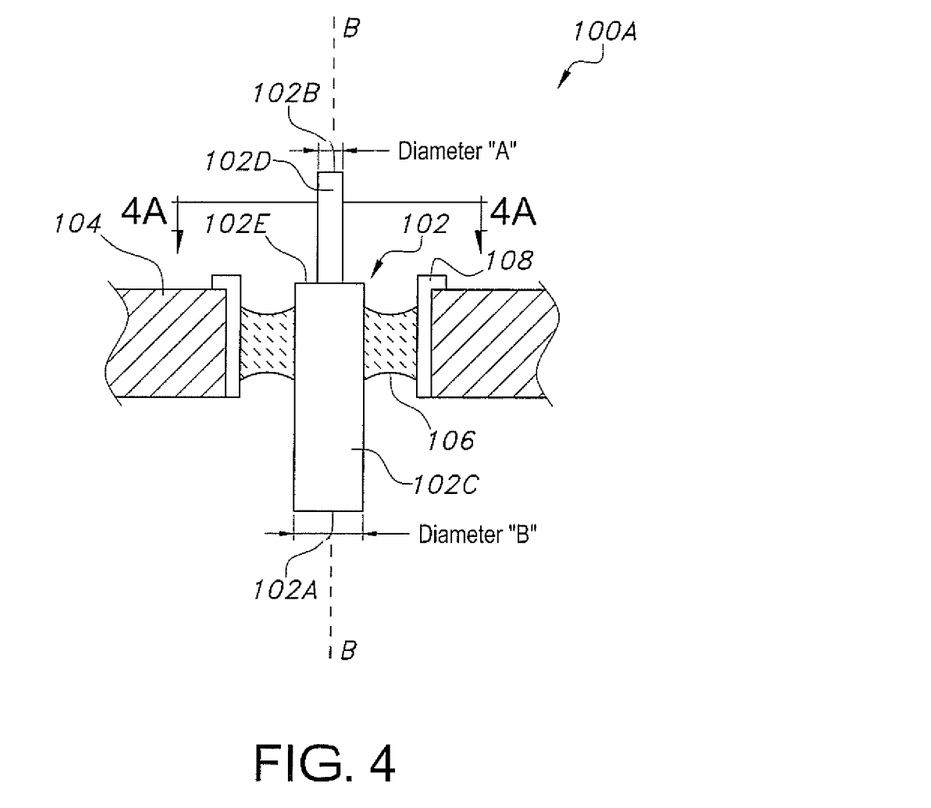
FIG. 4 is a cross-sectional view of a GTMS 100A similar to that shown in FIG. 3, but with the sealing glass 106 sealing to the terminal pin 102 and a ferrule 108 welded to a lid 104 for the electrochemical cell 10 shown in FIGS. 1 and 2.
Figure 4A:
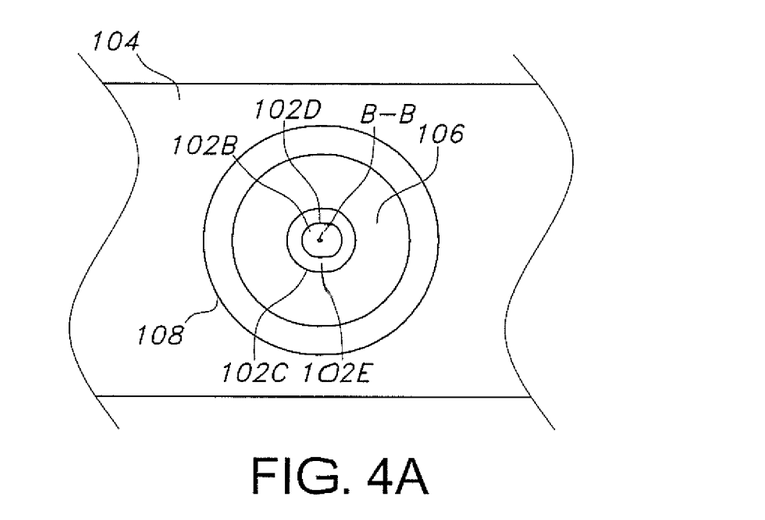
FIG. 4A is a plan view looking at the GTMS 100A along line 4A-4A of FIG. 4.

FIGS. 4 and 4A illustrate another embodiment of a lid assembly according to the present invention comprising a glass-to-metal seal (GTMS) 100A. Unlike the GTMS 100 shown in FIGS. 3 and 3A having the terminal pin 102 with two distinct diameter pin sections supported in an opening in a lid 104 by the sealing glass 106 without a ferrule, GTMS 100A includes a ferrule 108. The ferrule 108 is exemplary of those that are typically used in electrochemical cells and is directly welded into an opening in the lid 104. That is done after the GTMS 100A has been manufactured with the glass 106 sealing between the enlarged diameter pin section 102C of the terminal pin 102 and the ferrule 108. In all other aspects, the structure of the terminal pin 102 extending along longitudinal axis B-B and its positioning in the sealing glass 106 is the same as that described above with respect to the GTMS 100 shown in FIGS. 3 and 3A.

Figure 5:
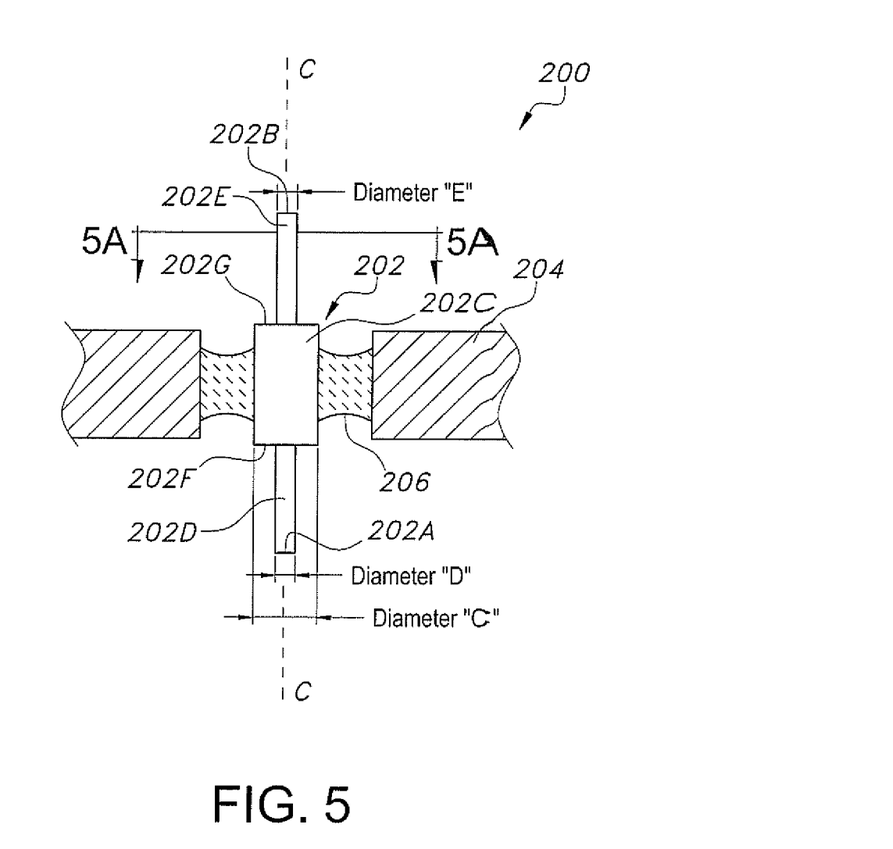
FIG. 5 is a cross-sectional view of a GTMS 200 according to the present invention having a terminal pin 202 with an intermediate enlarged diameter pin section 202C residing between opposed reduced diameter pins sections 202D and 202E.
Figure 5A:
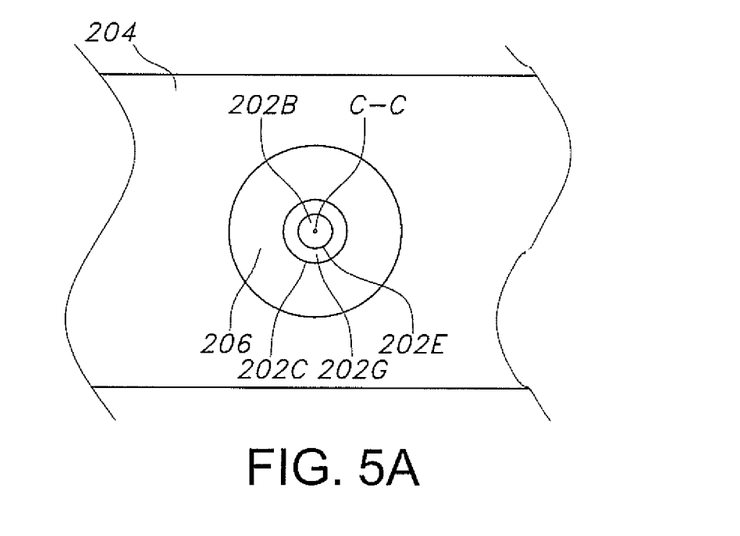
FIG. 5A is a plan view looking at the GTMS 200 along line 5A-5A of FIG. 5.

FIGS. 5 and 5A illustrate an alternate embodiment of a lid assembly according to the present invention comprising a glass-to-metal seal (GTMS) 200. The GTMS 200 has a terminal pin 202 supported in an opening in a lid 204 by a sealing glass 206. In this embodiment, the GTMS 200 does not have a ferrule. The sealing glass 206 is similar to those described above for the GTMS 40 shown in FIGS. 1 and 2 and the GTMSs 100 and 102A shown in FIGS. 3, 3A, 4 and 4A and serves to electrically isolate the terminal pin 202 from the lid 204. While not shown in the drawing, the lid 204 is welded to the open end of the container 14 to provide a casing for the electrochemical, as previously described.

The terminal pin 202 has a length extending along a longitudinal axis C-C from a terminal pin first end 202A to a terminal pin second end 202B. Unlike the terminal pin 102 for the GTMSs 100 and 100A shown in FIGS. 3, 3A, 4 and 4A, however, the terminal pin 202 shown in FIGS. 5 and 5A has an intermediate enlarged diameter pin section 202C having an enlarged diameter "C" residing between opposed outwardly extending third and fourth reduced diameter pin sections 202D and 202E. The third and fourth reduced diameter pin sections 202D and 202E have respective reduced diameters "D" and "E" that extend axially outwardly from respective steps 202F and 202G at the intermediate enlarged section 202C.

More specifically, the intermediate enlarged diameter pin section 202C of the terminal pin 202 has a cross-sectional diameter that ranges from about 0.015 inches to about 0.045 inches. At step 202F, the intermediate enlarged diameter pin section 202C transitions to a first reduced diameter pin section 202D extending axially to the terminal pin first end 202A. The reduced diameter pin section 202D has a cross-sectional diameter "D" that ranges from about 0.010 inches to about 0.020 inches. At a step 202G, opposed to the first reduced diameter pin section 202D, the intermediate enlarged diameter pin section 202C transitions to a second reduced diameter pin section 202E extending axially to the terminal pin second end 202B. The reduced diameter pin section 202E has a cross-sectional diameter "E" that ranges from about 0.010 inches to about 0.020 inches. Moreover, while the first and second reduced diameter pin sections 202D and 202E have respective diameters D and E that are less than the diameter C of the intermediate enlarged diameter pin section 202C, their diameters D and E can be the same or different.

This means that the first reduced diameter pin section 202D can have a diameter that is greater than, less than or the same as the diameter of the second reduced diameter pin section 202E. The only requirement is that the respective diameters D and E of the first and second reduced diameter pin sections 202D and 202E are less than the diameter C of the intermediate enlarged pin section 202C.

Further, it is preferred that the respective steps 202F and 202G from the intermediate enlarged diameter pin section 202C to the reduced diameter pin sections 202D and 202E reside at a distance from the sealing glass 206 that is from about 0.5× to about 3× the diameter of the intermediate enlarged diameter pin section 202C. This provides a sufficient distance so that the glass 206 is hermetically sealed to the enlarged diameter pin section 202C without its meniscus reaching the steps 202F and 202G. In an alternate embodiment, the sealing glass 206 contacts the enlarged diameter pin section 202C and extends to the step 202F but does not contact the reduced diameter pin section 202D and/or extends to the step 202G but does not contact the reduced diameter pin section 202E. In any event, for a reliable hermetic seal it is preferred that the sealing glass contacts the enlarged diameter pin section 202C. The reduced diameter pin sections 202D and 202E are desirable to help reduce the size or volume of the electrical connection to the tab 48B of the cathode current collector 48 and of the electrical connection of the electrochemical cell 10 to an external device, thereby reducing the size of the external device and possibly that of the electrochemical cell 10 as well.

Figure 6:
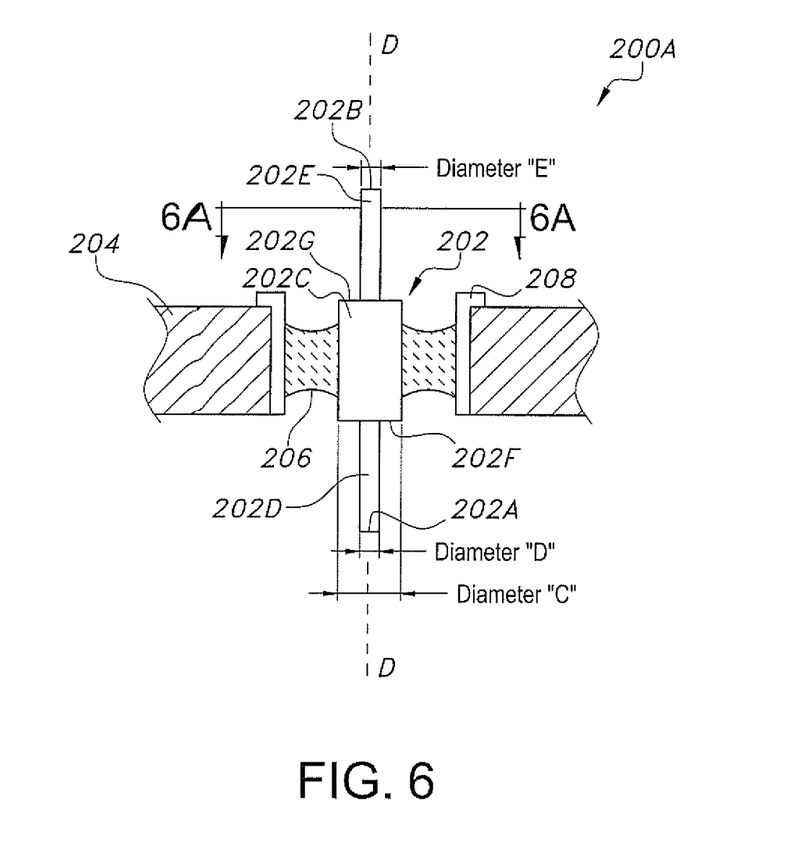
FIG. 6 is a cross-sectional view of a GTMS 202A similar to that shown in FIG. 5, but with the sealing glass 206 sealing to the terminal pin 202 and a ferrule 208 welded to a lid 204 for the electrochemical cell 10 shown in FIGS. 1 and 2.
Figure 6A:
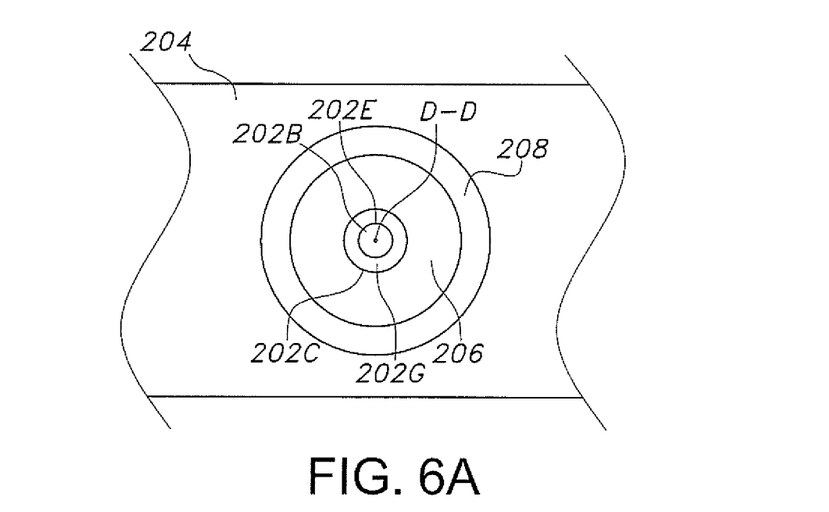
FIG. 6A is a plan view looking at the GTMS 200A along line 6A-6A of FIG. 6.

FIGS. 6 and 6A illustrate another embodiment of a lid assembly according to the present invention comprising a glass-to-metal seal (GTMS) 200A. Unlike the GTMS 200 shown in FIGS. 5 and 5A comprising the terminal pin 202 having the intermediate enlarged pin section 202C residing between the opposed reduced diameter pin sections 202D and 202E with the intermediate enlarged diameter pin section 202C supported in an opening in a lid 204 by the sealing glass 206 without a ferrule, GTMS 200A includes a ferrule 208. The ferrule 208 is exemplary of those that are typically used in electrochemical cells and is directly welded into an opening in the lid 204. That is done after the GTMS 200A has been manufactured with the glass 206 sealing between the intermediate enlarged diameter pin section 202C of the terminal pin 202 and the ferrule 208. In all other aspects, the structure of the terminal pin 202 extending along longitudinal axis D-D and its positioning in the sealing glass 206 is the same as that described above with respect to the GTMS 200 shown in FIG. 5.

It is further within the scope of the present invention that while the reduced diameter pin section 102D shown in FIGS. 3, 3A, 4 and 4A and the reduced diameter pin sections 202D, 202E shown in FIGS. 5, 5A, 6 and 6A are shown having a circular cross-section, that is for illustrative purposes. If desired, the various reduced diameter pin sections 102D, 202D and 202E can each have a cross-section with a planar surface, such as of a square, rectangular or other closed polygon, or have a cross-section with both curved arid planar surfaces. Further, while the reduced diameter pin section 102D is shown in FIGS. 3, 3A, 4 and 4A aligned along the respective longitudinal exes A-A and B-B, and the reduced diameter pin sections 202D, 202E shown in FIGS. 5, 5A, 6 and 6A aligned along the respective longitudinal axes C-C and D-D, that is also for illustrative purposes. If desired, the reduced diameter pin sections 102D, 202D and 202E can be off set from the longitudinal axes of their respective intermediate enlarged diameter pi sections 102C and 202C.

Thus, a novel lid assembly comprising a GTMS with a terminal pin having an enlarged diameter pin section contacted by sealing glass and with at least one reduced diameter pin section extending outwardly therefrom is described. The sealing glass contacting the terminal pin is sealed directly to the lid or to a ferrule supported by the lid.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
 a) a casing, comprising:
  i) an open-ended container;
  ii) a lid closing the open end of the container, wherein the lid has a lid opening; and
  iii) a glass-to-metal seal (GTMS) residing in the lid opening and comprising a sealing glass sealing between a terminal pin and the lid;
 b) an electrode assembly housed inside the casing, the electrode assembly comprising:
  i) one of an anode active material and a cathode active material contacted to a first current collector, wherein a first tab of the first current collector is connected to at least one of the container and the lid so that the casing serves as one of a negative terminal and a positive terminal for the cell;
  ii) the other of the anode active material and the cathode active material contacted to a second current collector, wherein a second tab of the second current collector is connected to the terminal pin of the GTMS so that the terminal pin serves as the other of the negative terminal and the positive terminal for the electrochemical cell;
  iii) a separator positioned between the anode and cathode active materials to prevent them from direct physical contact with each other; and
 c) an activating electrolyte contacting the electrode assembly inside the casing, d) wherein the terminal pin of the GTMS has an enlarged diameter pin section extending distally from a proximal end of the terminal pin to a step delineating the enlarged diameter pin section from a reduced diameter pin section extending outwardly from the casing, and wherein the enlarged diameter pin section of the terminal pin is contacted by the sealing glass.

2. The electrochemical cell of claim 1, wherein the enlarged diameter pin section is connected to the second tab of the second current collector.

3. The electrochemical cell of claim 1, wherein the sealing glass contacts the enlarged diameter pin section at a distance ranging from about 0.5× to 3× the diameter of the enlarged diameter pin section from the step.

4. The electrochemical cell of claim 1, wherein the sealing glass contacts the enlarged diameter pin section and extends to the step but does not contact the reduced diameter pin section.

5. The electrochemical cell of claim 1, wherein the enlarged diameter pin section of the terminal pin has a diameter that ranges from about 0.015 inches to about 0.045 inches.

6. The electrochemical cell of claim 1, wherein the reduced diameter pin section of the terminal pin has a diameter that ranges from about 0.010 inches to about 0.020 inches.

7. The electrochemical cell of claim 1, wherein the electrode assembly is of either a primary or a secondary chemistry.

8. A lid assembly for an electrochemical cell, the lid assembly comprising:
   a) a plate-shaped lid having an opening; and
   b) a glass-to-metal seal (GTMS) residing in the lid opening, the GTMS comprising a sealing glass sealing directly to a terminal pin and to the lid,
   c) wherein the terminal pin of the GTMS has an enlarged diameter pin section extending distally from a proximal end of the terminal pin to a step delineating the enlarged diameter pin section from a reduced diameter pin section extending outwardly from the casing, and wherein the enlarged diameter pin section of the terminal pin is contacted by the sealing glass.

9. The lid assembly of claim 8, wherein the sealing glass contacts the enlarged diameter pin section at a distance ranging from about 0.5× to 3× the diameter of the enlarged diameter pin section from the step.

10. The lid assembly of claim 8, wherein the sealing glass contacts the enlarged diameter pin section and extends to the step but does not contact the reduced diameter pin section.

11. The lid assembly of claim 8, wherein the enlarged diameter pin section of the terminal pin has a diameter that ranges from about 0.015 inches to about 0.045 inches.

12. The lid assembly of claim 8, wherein the reduced diameter pin section of the terminal pin has a diameter that ranges from about 0.010 inches to about 0.020 inches.

13. The lid assembly of claim 8, wherein the sealing glass contacts the enlarged diameter pin section of the terminal pin and extends to the step but does not contact the reduced diameter pin section.

14. An electrochemical cell, comprising:
   a) a casing, comprising:
      i) an open-ended container;
      ii) a lid closing the open end of the container, wherein the lid has a lid opening; and
      iii) a glass-to-metal seal (GTMS) comprising a sealing glass sealing between a terminal pin and a ferrule, wherein the ferrule of the GTMS is sealed to the lid in the lid opening;
   b) an electrode assembly housed inside the casing, the electrode assembly comprising:
      i) an anode active material contacted to an anode current collector, wherein an anode tab of the anode current collector is connected to at least one of the container and the lid so that the casing serves as the negative terminal for the cell;
      ii) a cathode active material contacted to a cathode current collector, wherein a cathode tab of the cathode current collector is connected to the terminal pin of the GTMS so that the terminal pin serves as the positive terminal for the electrochemical cell;
      iii) a separator positioned between the anode and the cathode to prevent them from direct physical contact with each other; and
   c) an activating electrolyte contacting the electrode assembly inside the casing,
   d) wherein the terminal pin of the GTMS has an enlarged diameter pin section extending distally from a proximal end of the terminal pin to a step delineating the enlarged diameter pin section from a reduced diameter pin section extending outwardly from the casing, and wherein the enlarged diameter pin section of the terminal in is contacted by the sealing glass.

* * * * *